United States Patent
Taylor-Tibbott et al.

(10) Patent No.: US 10,859,166 B2
(45) Date of Patent: Dec. 8, 2020

(54) GAS TURBINE ENGINE

(71) Applicant: ROLLS-ROYCE plc, London (GB)

(72) Inventors: Oliver C. Taylor-Tibbott, Lichfield (GB); Zahid M. Hussain, Derby (GB)

(73) Assignee: ROLLS-ROYCE plc, London (GB)

( * ) Notice: Subject to any disclaimer, the term of this patent is extended or adjusted under 35 U.S.C. 154(b) by 242 days.

(21) Appl. No.: 15/936,773

(22) Filed: Mar. 27, 2018

(65) Prior Publication Data
US 2018/0283207 A1 Oct. 4, 2018

(30) Foreign Application Priority Data
Mar. 28, 2017 (GB) .................................. 1704888.5

(51) Int. Cl.
| | | |
|---|---|---|
| *B64D 29/00* | (2006.01) | |
| *F16K 1/22* | (2006.01) | |
| *F01D 25/24* | (2006.01) | |
| *F16K 17/164* | (2006.01) | |
| *F01D 21/14* | (2006.01) | |

(52) U.S. Cl.
CPC .............. *F16K 1/223* (2013.01); *B64D 29/00* (2013.01); *F01D 25/24* (2013.01); *F16K 17/164* (2013.01); *F01D 21/14* (2013.01); *F05D 2240/14* (2013.01); *F05D 2260/605* (2013.01)

(58) Field of Classification Search
CPC ..... F05D 2240/14; F01D 25/12; B64D 13/04; B64D 2033/0246; B64D 29/08
See application file for complete search history.

(56) References Cited

U.S. PATENT DOCUMENTS

| | | | |
|---|---|---|---|
| 4,232,513 A | 11/1980 | Pearson et al. | |
| 4,351,501 A * | 9/1982 | Peash ..................... | B64D 13/02 |
| | | | 137/614.11 |
| 5,197,290 A * | 3/1993 | Lee ........................... | F23R 3/14 |
| | | | 137/855 |
| 5,598,990 A * | 2/1997 | Farokhi .................. | B64C 23/06 |
| | | | 244/198 |
| 5,623,820 A * | 4/1997 | Balzer .................... | B64D 27/00 |
| | | | 60/39.091 |
| 5,704,207 A | 1/1998 | Jensen et al. | |
| 5,871,178 A * | 2/1999 | Barnett ..................... | B64C 1/18 |
| | | | 244/118.5 |
| 2011/0240137 A1* | 10/2011 | Vauchel ................. | B64D 29/00 |
| | | | 137/15.2 |
| 2013/0067882 A1 | 3/2013 | West | |
| 2018/0010518 A1* | 1/2018 | Ortmanns .............. | B64D 29/00 |
| 2018/0142624 A1* | 5/2018 | Song ..................... | B64D 29/06 |

OTHER PUBLICATIONS

Great Britain Search Report dated Sep. 27, 2017, issued in GB Patent Application No. 1704888.5.

* cited by examiner

*Primary Examiner* — Gerald L Sung
(74) *Attorney, Agent, or Firm* — Oliff PLC

(57) ABSTRACT

A pressure relief arrangement for a gas turbine engine comprises a panel and a plurality of pressure relief mechanisms provided in the panel. The mechanisms have a first configuration and a second configuration. In the first configuration the panel is sealed to prevent fluid flow through the panel in a thickness direction and in the second configuration the mechanisms are arranged so that a plurality of holes are provided in the panel so fluid can flow through the panel in a thickness direction.

12 Claims, 3 Drawing Sheets

GAS TURBINE ENGINE

CROSS-REFERENCE TO RELATED APPLICATIONS

This application is based upon and claims the benefit of priority from British Patent Application Number 1704888.5 filed 28 Mar. 2017, the entire contents of which are incorporated by reference.

BACKGROUND

1. Field of the Disclosure

The present disclosure concerns a pressure relief arrangement and/or a gas turbine engine.

2. Description of the Related Art

Gas turbine engines are typically employed to power aircraft. Typically a gas turbine engine will comprise an axial fan driven by an engine core. The engine core is generally made up of one or more turbines which drive respective compressors via coaxial shafts. The fan is usually driven off an additional lower pressure turbine in the engine core. Airflow from the fan is split with most of the air being directed through a bypass duct and the remainder of the air being directed to the engine core. A casing is provided around the engine core, and various components that protrude into the bypass duct connect to the engine core. In some gas turbine engine designs, an A-frame is provided between the engine core and an outer bypass casing for the transmission of torsional loads. One or more emergency pressure relief doors may be provided for preventing over pressure in core components in an event such as a burst pipe or duct. Conventionally, a pressure relief door is hinged to an adjacent structure, for example the casing. The hinge is arranged to define the arc within which the door opens. A cable may be provided which connects the door to a mounting spaced from the door. The cable sets the limit of maximum opening of the door. A piston and cylinder arrangement is also connected between the door and the mount for dissipating energy in the event of the door opening. Conventionally, the cylinder includes a medium, such as a honeycomb, which the piston crushes when the door is opened to dissipate energy. The extent the door opens needs to be restricted and energy needs to be dissipated during opening to avoid or reduce impacts with components of the gas turbine engine, so as to avoid the door damaging engine components. The cable, piston and cylinder arrangement is fairly complex and it can be susceptible to mechanism failures over time.

SUMMARY

The present disclosure seeks to provide an arrangement for controlling a burst duct door that is less complex than conventional arrangements.

According to a first aspect there is provided a pressure relief arrangement for a gas turbine engine. The arrangement comprises a panel and a plurality of pressure relief mechanisms provided in the panel. The mechanisms having a first configuration and a second configuration, wherein in the first configuration the panel is sealed to prevent fluid flow through the panel in a thickness direction and in the second configuration the mechanisms are arranged so that a plurality of holes are provided in the panel so fluid can flow through the panel in a thickness direction.

The first configuration may be considered to be a closed configuration and the second configuration may be considered to be an open configuration.

The plurality of pressure relief mechanisms may be provided in a plurality of rows.

The plurality of pressure relief mechanisms may be aligned in a first (for example longitudinal) direction and staggered in a second (for example circumferential) direction.

Each pressure relief mechanism may comprise a hole in the panel and a valve member. The valve member may cover the hole in the first configuration and expose the hole in the second configuration.

The valve member may be a hinged tab covering and sealing the hole in the first configuration, and angled to the panel in the second configuration so as to permit fluid flow through the hole.

A hinged joint between the tab and the panel may extend linearly along one end of the tab.

The tab may have a first perimeter that is aligned with the panel in the first configuration and is out of alignment with the panel in the second configuration. The tab may have a second perimeter that defines a hinged joint between the tab and the panel. The length of the second perimeter may be less than or equal to one half of the first perimeter, e.g. the second perimeter may be 40%, 30%, or 20% of the first perimeter.

The tab may have a bulbous shape. The tab may be bulbous at an end of the tab opposite the hinged joint.

The panel may include a recess and the pressure relief mechanisms may be provided in the recess.

The recess may extend across the majority of the panel, so that a lip is defined around a periphery of the panel.

The panel may be arcuate. The recess may be provided on a radially inner side (or concave side) of the panel.

The mechanisms may be provided at staggered positions in a longitudinal and/or a width direction of the panel.

In the case of the panel forming part of a casing or nacelle, the longitudinal direction may be an axial direction and the width direction may be a circumferential direction. In such examples, a thickness direction is in a radial direction.

In an aspect there is provided a pressure relief arrangement for a gas turbine engine. The arrangement comprises a panel. A plurality of holes and a plurality of hinged tabs are provided along the panel. The hinged tabs are arranged to cover the holes in a first configuration and to expose the holes in a second configuration.

The arrangement may comprise one or more features of the arrangement of the previous aspect.

In an aspect there is provided a gas turbine engine comprising the arrangement according to any one of the previous aspects.

The gas turbine engine may comprise an engine core, and a casing member surrounding the engine core, and wherein the panel is provided adjacent the casing member and the mechanisms or tabs are arranged to permit fluid flow away from the engine core in the second configuration.

The skilled person will appreciate that except where mutually exclusive, a feature described in relation to any one of the above aspects may be applied mutatis mutandis to any other aspect. Furthermore except where mutually exclusive any feature described herein may be applied to any aspect and/or combined with any other feature described herein.

BRIEF DESCRIPTION OF THE DRAWINGS

Embodiments will now be described by way of example only, with reference to the Figures, in which.

DETAILED DESCRIPTION OF THE DISCLOSURE

Figure 1:
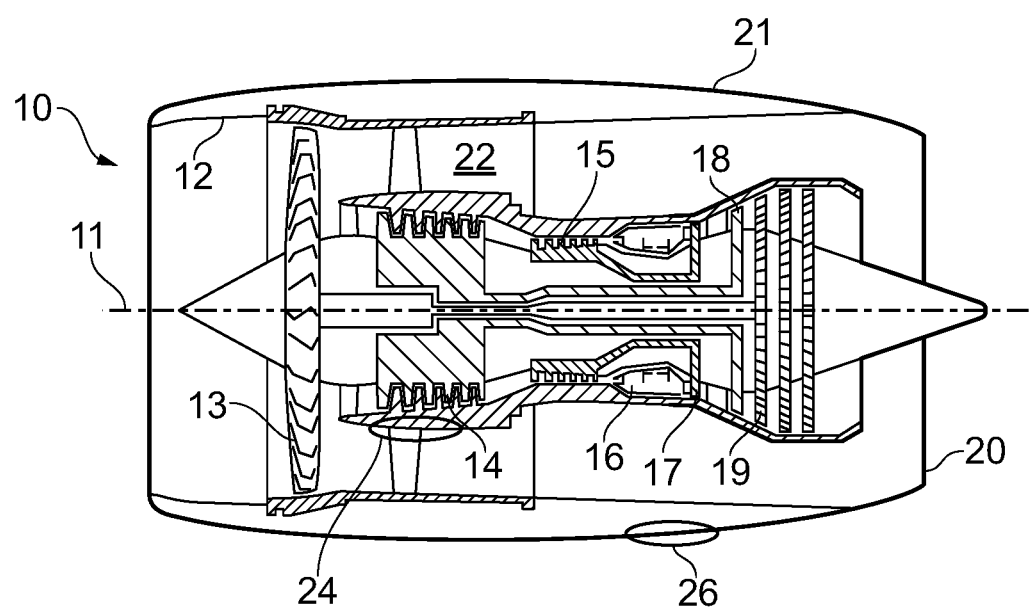
FIG. 1 is a sectional side view of a gas turbine engine.

With reference to FIG. 1, a gas turbine engine is generally indicated at 10, having a principal and rotational axis 11. The engine 10 comprises, in axial flow series, an air intake 12, a propulsive fan 13, an intermediate pressure compressor 14, a high-pressure compressor 15, combustion equipment 16, a high-pressure turbine 17, an intermediate pressure turbine 18, a low-pressure turbine 19 and an exhaust nozzle 20. A nacelle 21 generally surrounds the engine 10 and defines both the intake 12 and the exhaust nozzle 20.

The gas turbine engine 10 works in the conventional manner so that air entering the intake 12 is accelerated by the fan 13 to produce two air flows: a first air flow into the intermediate pressure compressor 14 and a second air flow which passes through a bypass duct 22 to provide propulsive thrust. The intermediate pressure compressor 14 compresses the air flow directed into it before delivering that air to the high pressure compressor 15 where further compression takes place.

The compressed air exhausted from the high-pressure compressor 15 is directed into the combustion equipment 16 where it is mixed with fuel and the mixture combusted. The resultant hot combustion products then expand through, and thereby drive the high, intermediate and low-pressure turbines 17, 18, 19 before being exhausted through the nozzle 20 to provide additional propulsive thrust. The high 17, intermediate 18 and low 19 pressure turbines drive respectively the high pressure compressor 15, intermediate pressure compressor 14 and fan 13, each by suitable interconnecting shaft.

Other gas turbine engines to which the present disclosure may be applied may have alternative configurations. By way of example such engines may have an alternative number of interconnecting shafts (e.g. two) and/or an alternative number of compressors and/or turbines. Further the engine may comprise a gearbox provided in the drive train from a turbine to a compressor and/or fan.

A pressure relief arrangement may be provided at a location between the core and the bypass duct, the location of the pressure relief arrangement is indicated generally at 24 in FIG. 1. In some embodiments, a pressure relief arrangement may be provided in a location indicated generally at 26. Often pressure relief arrangements are provided on the edge of ventilation zones to provide pressure relief in the event of a pipe or duct failure.

Figure 2A:
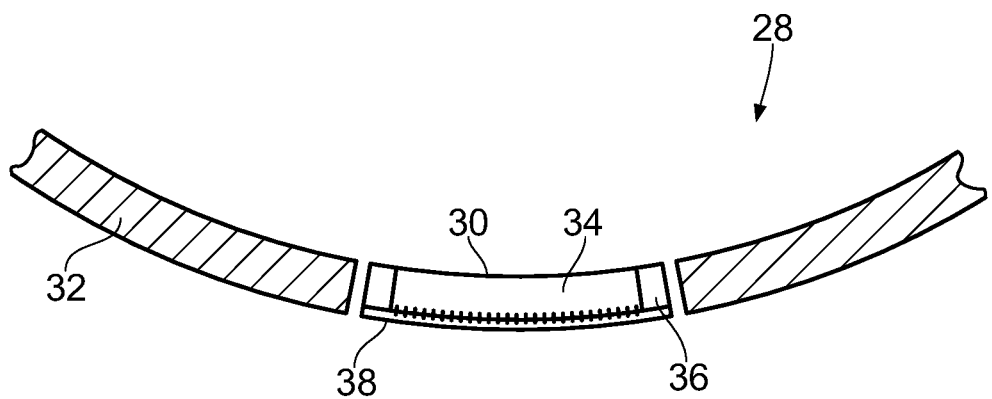
FIG. 2A is a sectional view of a pressure relief arrangement in a first configuration.
Figure 2B:
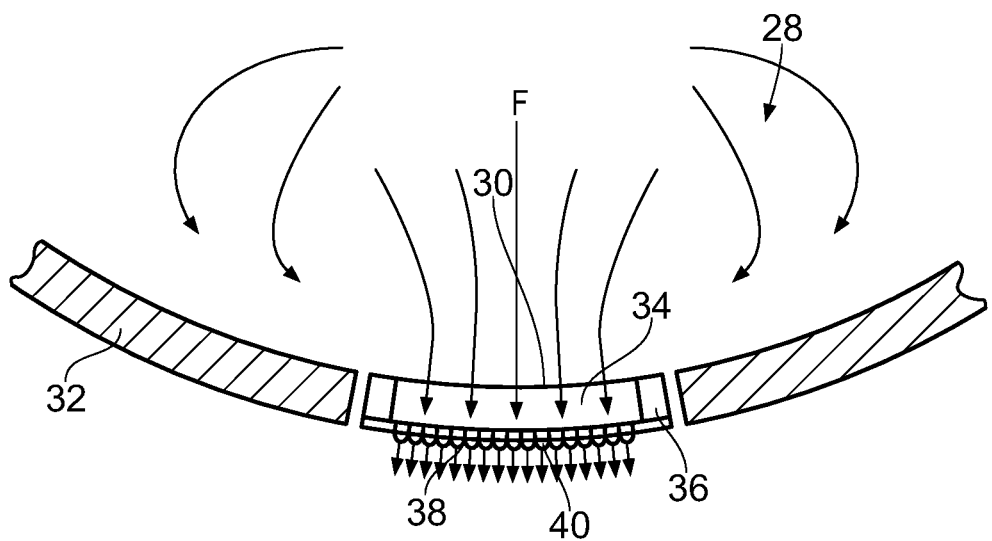
FIG. 2B is a sectional view of the pressure relief arrangement of FIG. 2 in a second configuration.
Figure 3:
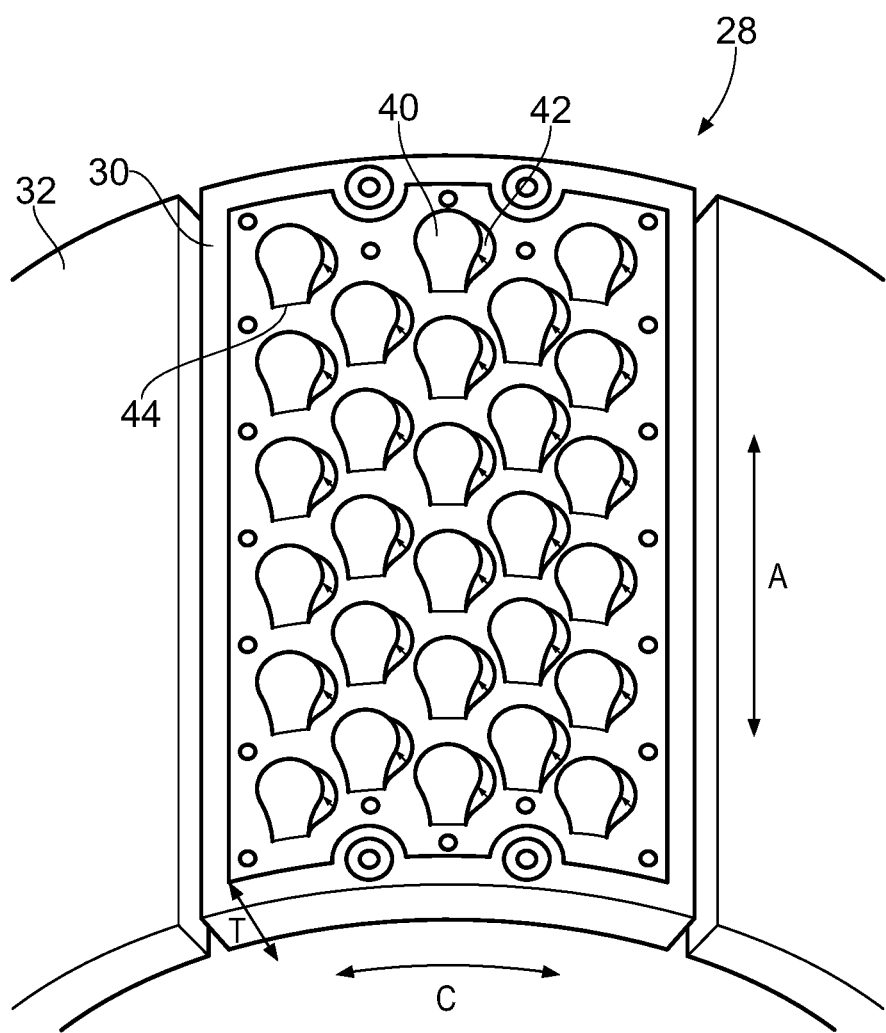
FIG. 3 is a plan view of a pressure relief arrangement in the second configuration.

Referring to FIGS. 2A, 2B and 3, a pressure relief arrangement is illustrated generally at 28. The pressure relief arrangement includes a panel 30. In the present example, the panel 30 is arcuate in cross section. The panel is provided adjacent casing members 32 and is arranged so as to define a radially outer surface 38 that is aligned with a radially outer surface of the casing members.

Referring to FIG. 3, in the present application, a circumferential direction C is defined with respect to the arc of the panel 30 and/or the casing members 32. An axial direction A is defined with respect to the principal axial flow of air through the gas turbine engine. A thickness direction T (or radial direction) is perpendicular to the circumferential direction and the axial direction.

The panel 30 includes a recess 30 that extends across the majority of the panel so as to define a lip 36 around the periphery of the panel. The recess 30 and the lip 36 are provided on a radially inner side of the panel. The lip is dimensioned to be substantially the same thickness as the casing members 32.

A plurality of pressure relief mechanisms are provided in the recess 30 of the panel. In the present example the pressure relief mechanisms each include a tab 40 and a hole 42. The tabs 40, of this example, are bulbous in shape. In the present example, the tabs 40 are aligned in a longitudinal direction and are staggered in a circumferential direction. This arrangement is provided to maximise the number of tabs provided in the panel. The tabs are connected to the remainder of the panel at a linear hinged joint 44. The length of a perimeter that is moveable out of contact with the panel is more than half the length of the length of the hinged joint 44. In alternative embodiments, the shape of the tabs may be varied, but preferably the tabs are arranged such that the length of a perimeter of each tab that is moveable out of contact with the panel should be equal to or more than half the length of the hinged joint between the tab and the panel.

In the present example, the tabs are the same size as the holes 42. In a first configuration (illustrated in FIG. 2A), the tabs seal the holes 42 so that no fluid can flow through the panel 30 in a thickness direction. In a second configuration (illustrated in FIGS. 2B and 3), the tabs hinge open so as to expose the holes 42 to permit fluid flow through the panel 30 in a thickness direction.

Under normal operating conditions, the tabs 40 seal the panel 30 so there is substantially no fluid flow through the panel 30. However, in an over pressure event, for example in the event of a burst pipe or duct, the tabs 40 will open and fluid will be permitted to flow through the holes 42 in the panel, as illustrated by arrows F in FIG. 2B.

The tabs 40 may be connected to the remainder of the panel 30 in the first configuration in a manner that mechanically fails when there is an increased pressure differential across the panel thickness. For example, the tabs may be connected to the remainder of the panel via a latch, or they may be connected by a joint intended to fail, e.g. the periphery of the tab may be machined into the panel, so failure occurs along the periphery of the tab in an over pressure event and the tab opens. Alternatively, a control mechanism may be provided, and the tabs may be opened in response to a pressure sensed by a pressure sensor.

Seals may be provided between the hole 42 and the tab 40 in the first configuration, to reduce fluid leakage through the holes 42.

The tabs 40 may be connected to the remainder of the panel 30 by a connector, e.g. a wire or cable, to limit opening of the tab in the second configuration.

The present example has described the pressure relief mechanisms as being hinged tabs, but in alternative embodiments the pressure relief arrangements may have an alternative configuration. For example, covers may be provided over the holes 42, and the covers may be fully released from the holes in an over pressure event. The covers may be connected to the panel by a wire or cable so as to not be fully released from the panel. Further alternatively, the holes may be provided with a valve member that is closed in the first configuration and open in the second configuration, for example a butterfly valve-type component may be associated with each hole.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

We claim:

1. A pressure relief arrangement for a gas turbine engine, the pressure relief arrangement comprising:
   a panel for a casing or a nacelle of the gas turbine engine; and
   a plurality of pressure relief mechanisms provided in a plurality of rows and columns in the panel, the plurality of pressure relief mechanisms having a plurality of holes and a plurality of tabs, one of each in each of the plurality of relief mechanisms, wherein in a first configuration the plurality of holes are sealed by the plurality of tabs to prevent fluid flow through the panel in a thickness direction and in the second configuration the plurality of holes are not sealed by the plurality of tabs and thus allow the fluid to flow through the panel in the thickness direction, wherein
   each of the plurality of tabs is hinged and covers and seals a respective one of the plurality of holes in the first configuration, and angled to the panel in the second configuration so as to permit the fluid through the plurality of holes, and
   each of the plurality of relief mechanisms comprises a hinged joint between a respective one of the plurality of tabs and the panel and each of the hinged joints extends linearly along one end of the respective one of the plurality of tabs.

2. The pressure relief arrangement according to claim 1, wherein the plurality of pressure relief mechanisms are aligned in a first direction and staggered in a second direction.

3. The pressure relief arrangement according to claim 2, wherein the first direction is longitudinal and the second direction is circumferential.

4. The pressure relief arrangement according to claim 1, wherein the each of the plurality of tabs has a bulbous shape.

5. The pressure relief arrangement according to claim 4, wherein each of the plurality of tabs is bulbous at an end opposite the hinged joint.

6. The pressure relief arrangement according to claim 1, wherein each of the plurality of tabs has a first perimeter that is aligned with the panel in the first configuration and is out of the alignment with the panel in the second configuration, and a second perimeter that defines the hinged joint between each of the plurality of tabs and the panel, and wherein a length of the second perimeter is less than or equal to one half of the first perimeter.

7. The pressure relief arrangement according to claim 6, wherein the length of the second perimeter is less than or equal to 20% of the first perimeter.

8. The pressure relief arrangement according to claim 1, wherein the panel includes a recess and the plurality of pressure relief mechanisms are provided in the recess.

9. The pressure relief arrangement according to claim 8, wherein the recess extends across the majority of the panel, so that a lip is defined around a periphery of the panel.

10. The pressure relief arrangement according to claim 1, wherein the plurality of pressure relief mechanisms are provided at staggered positions in a longitudinal and/or a width direction of the panel.

11. A gas turbine engine comprising the pressure relief arrangement according to claim 1.

12. The gas turbine engine according to claim 11, comprising an engine core, and a casing member surrounding the engine core, and wherein the panel is provided adjacent the casing member and the plurality of pressure relief mechanisms are arranged to permit the fluid flow away from the engine core in the second configuration.

* * * * *